United States Patent
Lin et al.

(10) Patent No.: US 8,602,623 B2
(45) Date of Patent: Dec. 10, 2013

(54) ELECTRONIC DEVICE AND LIGHT-GUIDING STRUCTURE THEREOF

(75) Inventors: Hui-Ling Lin, Yunlin County (TW); Chih-Wei Wang, New Taipei (TW); Shih-Chung Lo, New Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 255 days.

(21) Appl. No.: 13/244,313

(22) Filed: Sep. 24, 2011

(65) Prior Publication Data

US 2012/0218780 A1    Aug. 30, 2012

(30) Foreign Application Priority Data

Feb. 25, 2011  (CN) ..................... 2011 2 0047192 U

(51) Int. Cl.
  *F21V 33/00*    (2006.01)
(52) U.S. Cl.
  USPC ........... 362/602; 362/612; 362/628; 362/555; 362/559
(58) Field of Classification Search
  USPC .......... 362/612, 602, 605, 628, 555, 559, 565
  See application file for complete search history.

(56) References Cited

U.S. PATENT DOCUMENTS

| 6,811,273 | B2* | 11/2004 | Satoh et al. | 362/27 |
|---|---|---|---|---|
| 6,874,921 | B2* | 4/2005 | Verlage et al. | 362/487 |
| 7,726,862 | B2* | 6/2010 | Lin | 362/555 |
| 2006/0171137 | A1* | 8/2006 | Tamaki | 362/26 |
| 2006/0198123 | A1* | 9/2006 | Radu | 362/135 |
| 2009/0147536 | A1* | 6/2009 | Lai | 362/619 |
| 2009/0284974 | A1* | 11/2009 | Kempkey et al. | 362/253 |
| 2010/0008103 | A1* | 1/2010 | Lee et al. | 362/621 |
| 2010/0128496 | A1* | 5/2010 | Chang | 362/628 |
| 2011/0228552 | A1* | 9/2011 | Kevelos et al. | 362/558 |

* cited by examiner

*Primary Examiner* — Laura Tso
(74) *Attorney, Agent, or Firm* — Li & Cai Intellectual Property (USA) Office

(57) ABSTRACT

An electronic device is disclosed, which includes a housing, a touch pad structure, and a light-guiding structure. The light-guiding structure includes a light-guiding plate and a plurality of light-emitting units. The light-guiding plate has a main body and a thru-opening formed on the main body. The main body has a pair of opposing first edge portions and a pair of opposing second edge portions. A light-guiding member is formed on the main body around the thru-opening. The light-emitting units are disposed on or beyond the light-guiding pate and around the light-guiding member and illuminate toward the first and second edge portions. The touch pad structure is received in the thru-opening and surrounded by the light-guiding member. The touch pad structure and the light-guiding member are exposed through a slot of the housing.

20 Claims, 8 Drawing Sheets

ELECTRONIC DEVICE AND LIGHT-GUIDING STRUCTURE THEREOF

BACKGROUND OF THE INVENTION

1. Field of the Invention

The present invention relates to an electronic device and a light-guiding structure thereof; more particularly, to an electronic device having a touch pad structure and a light-guiding structure thereof.

2. Description of Related Art

Nowadays, a variety of touch structures have been developed to provide human-machine interface in electronic devices, such as touch structure having a touch pad. A light-guiding structure has been applied to the electronic device to make the periphery of the touch pad structure illuminate.

In a conventional light-guiding structure, a rectangular light-guiding plate is usually disposed under the touch pad structure. Light emitted by the corresponding light-emitting units is transmitted toward the light-guiding plate and creates illumination effect around the periphery of the touch pad structure. However, by stacking the touch pad structure with an extra light-guiding plate, the thickness of the overall electronic device is undesirably increased.

To address the above issue, the inventors propose the following solution.

SUMMARY OF THE INVENTION

The present invention provides a light-guiding structure for the touch pad structure of an electronic device that is capable of achieving lower overall thickness and providing illumination around the touch pad structure thereof.

Accordingly, the electronic device has a housing, a touch pad structure, and a light-guiding structure. A slot is formed on the housing. The light-guiding structure includes a light-guiding plate and a plurality of light-emitting units. The light-guiding plate has a main body and a thru-opening formed thereon. The main body has a pair of opposing first edge portions and a pair of opposing second edge portions. A light-guiding member is formed around the thru-opening on a surface of the main body. The light-emitting units are disposed around the light-guiding member and illuminate toward the first and the second edge portions. The touch pad structure is received by the thru-opening and surrounded by the light-guiding member. The touch pad structure and the light-guiding member are exposed through the slot of the housing.

Furthermore, the light-guiding structure includes a light-guiding plate and a plurality of light-emitting units. The light-guiding plate has a main body and a thru-opening formed thereon. The main body has a pair of opposing first edge portions and a pair of opposing second edge portions. A light-guiding member (a rim-like protrusive member) is formed around the thru-opening on a surface of the main body. A plurality of micro structures is formed around the thru-opening on an opposite surface of the main body. The light-emitting units are disposed around the light-guiding member to provide illumination toward the first and second edge portions.

The present invention has the following advantages. The electronic device has the touch pad structure and the light-guiding structure. The light-guiding plate of the light-guiding structure has the thru-opening formed thereon for receiving the touch pad structure. Thereby, the overall thickness for the combination of the light-guiding structure and the touch pad structure can be reduced. In addition, the light-guiding plate has the light-guiding member formed around the thru-opening of the main body for illumination around the touch pad structure.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF PREFERRED EMBODIMENTS

Figure 1:
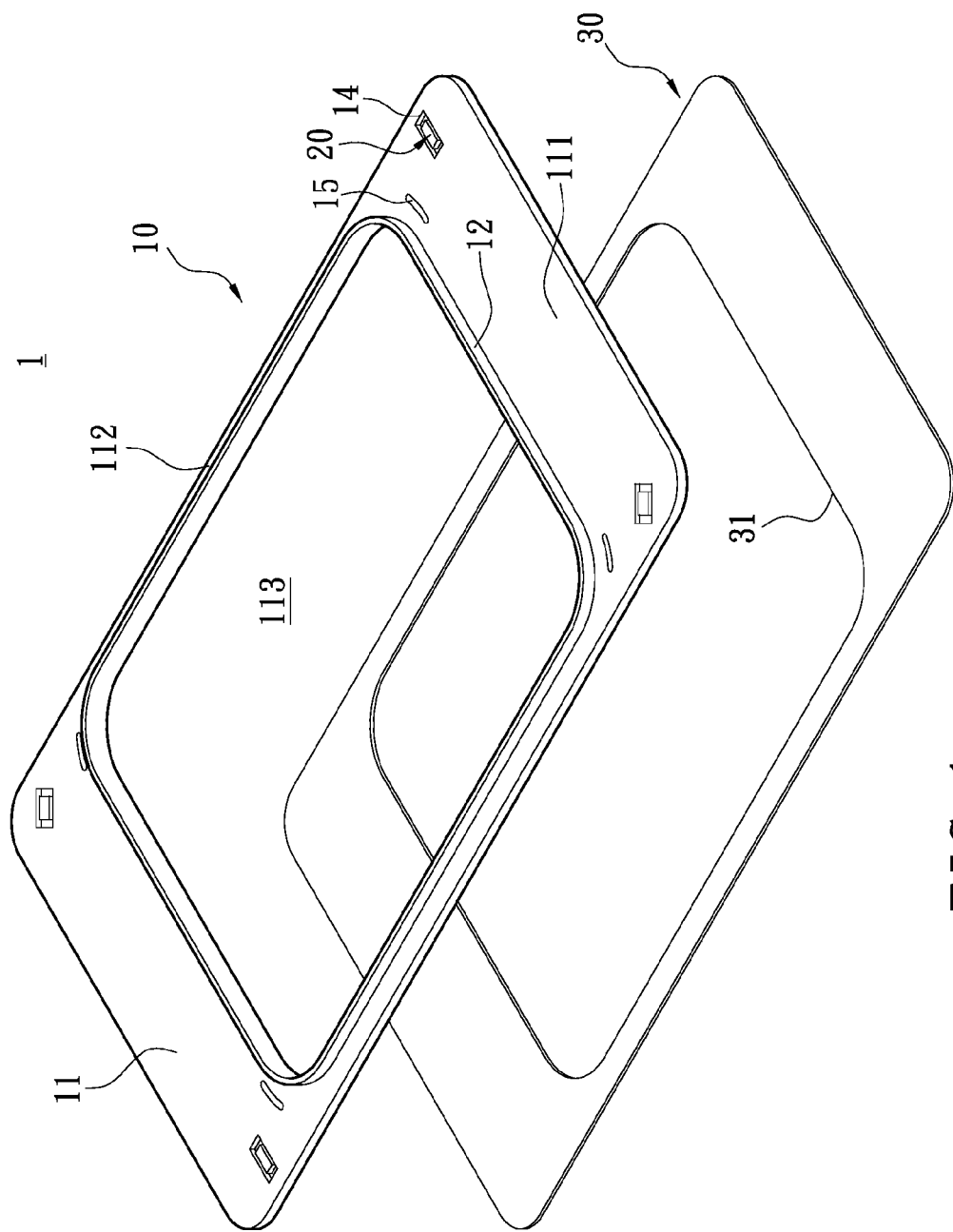
FIG. 1 is an exploded view of a light-guiding structure according to the first preferred embodiment of the present invention.

Before the present invention is described in greater detail in connection with the preferred embodiments, it should be noted that similar elements and structures are designated by like reference numerals throughout the entire disclosure.

Figure 2:
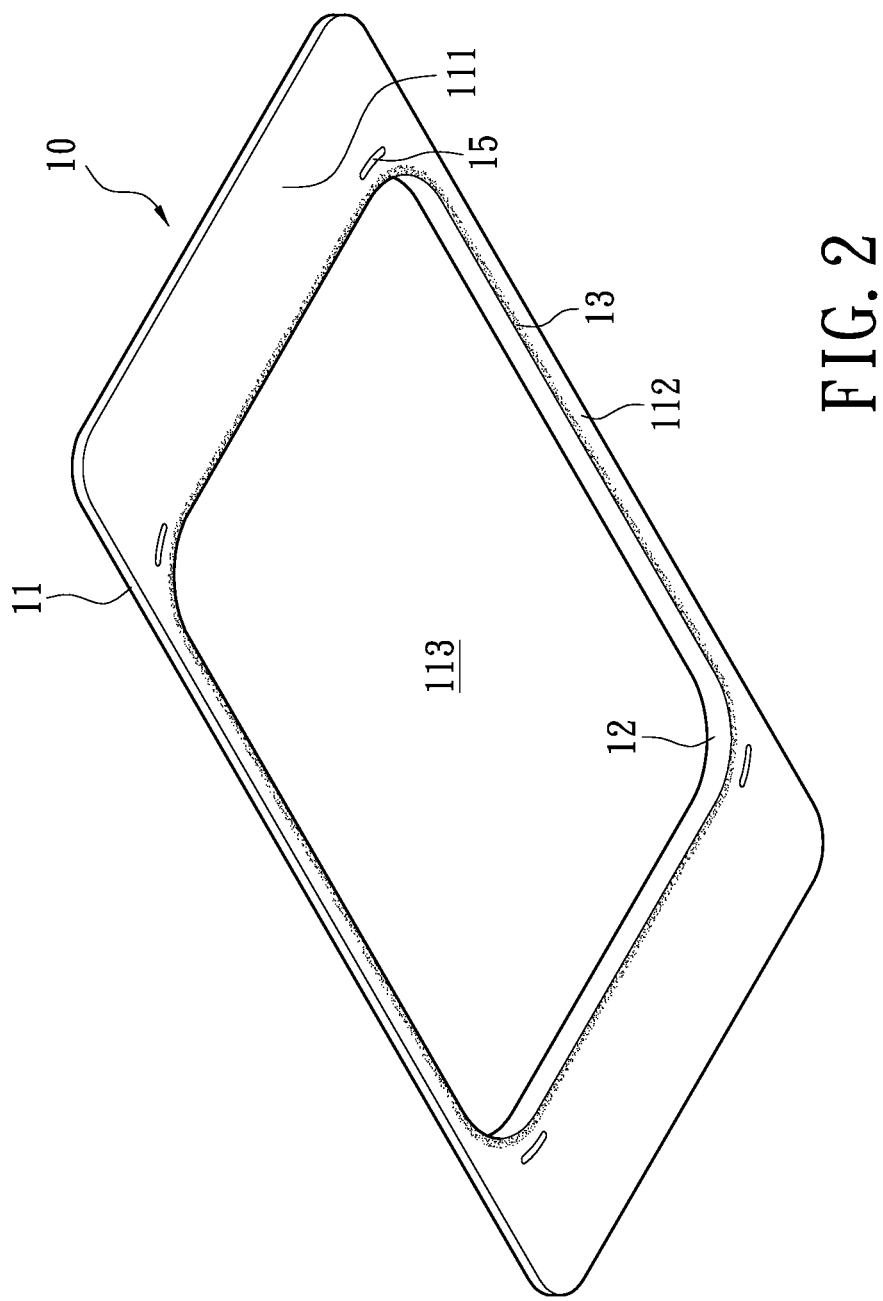
FIG. 2 is a perspective view of the first preferred embodiment.
Figure 3:
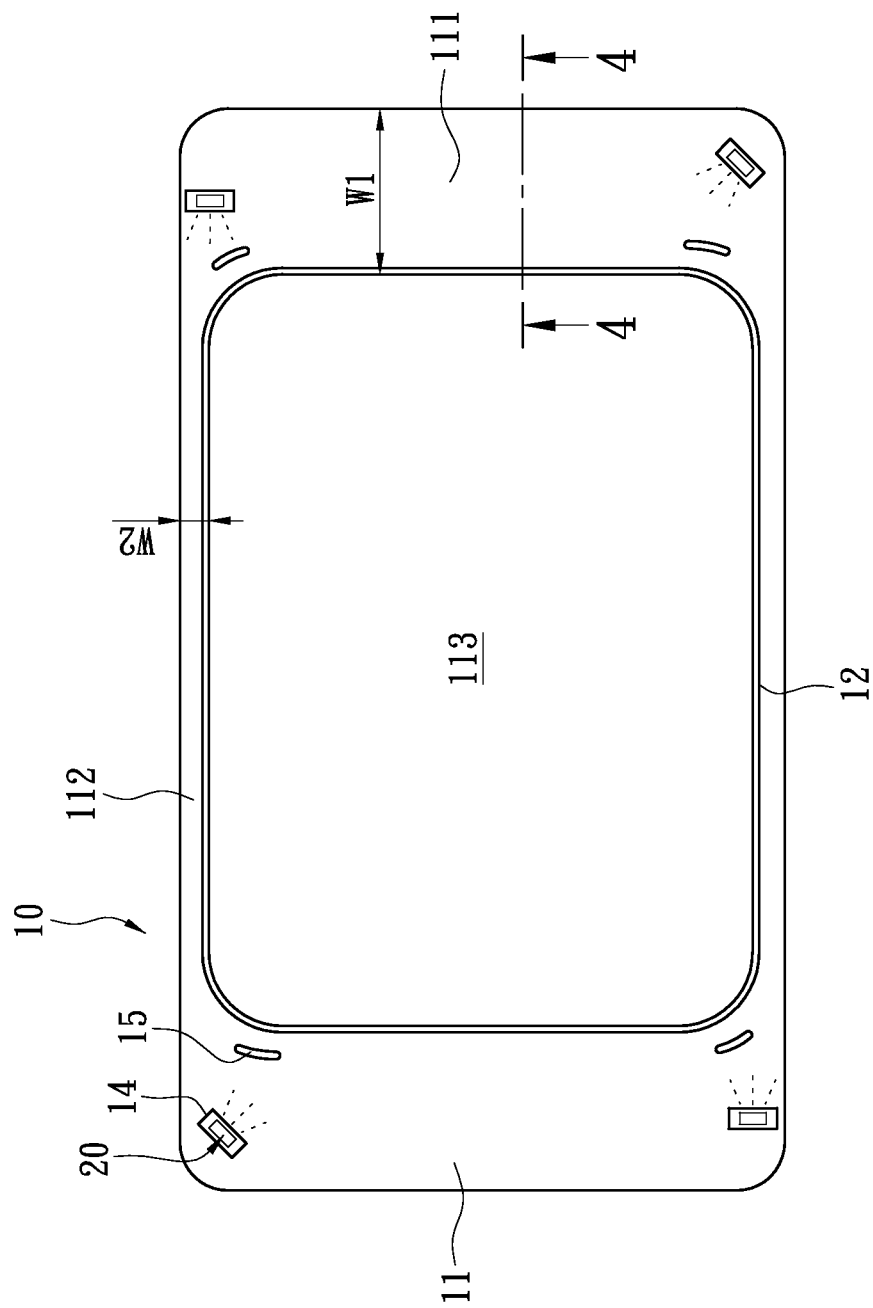
FIG. 3 is a top view of the first preferred embodiment.
Figure 5:
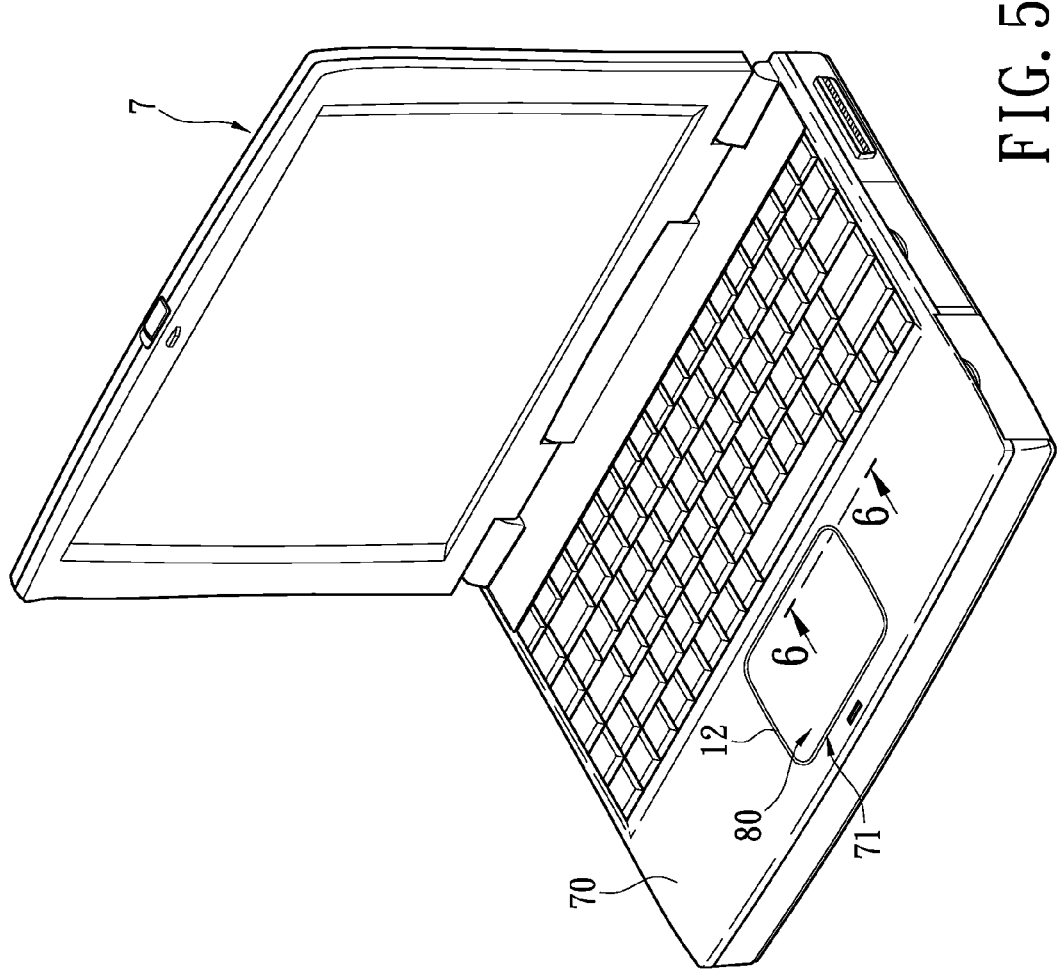
FIG. 5 is a schematic view of an electronic device having the light-guiding structure of the first preferred embodiment.

Please refer to FIGS. 1 to 3. The first preferred embodiment of a light-guiding structure 1 according to this invention is mounted on an electronic device 7 (as shown in FIG. 5). The light-guiding structure 1 comprises a light-guiding plate 10 and a plurality of light-emitting units 20.

The light-guiding plate 10 is made of light transmissive material and has a main body 11 having a thru-opening 113 formed thereon. The main body 11 has a pair of opposing first edge portions 111 and a pair of opposing second edge portions 112. The first edge portion 111 has a width W1, which is greater than the width W2 of the second edge portion 112. For this embodiment, the main body 11 and the thru-opening 113 are both round or angled rectangular shaped. The rectangular thru-opening 113 is defined by the first and second edge portions 111 and 112.

Figure 4:
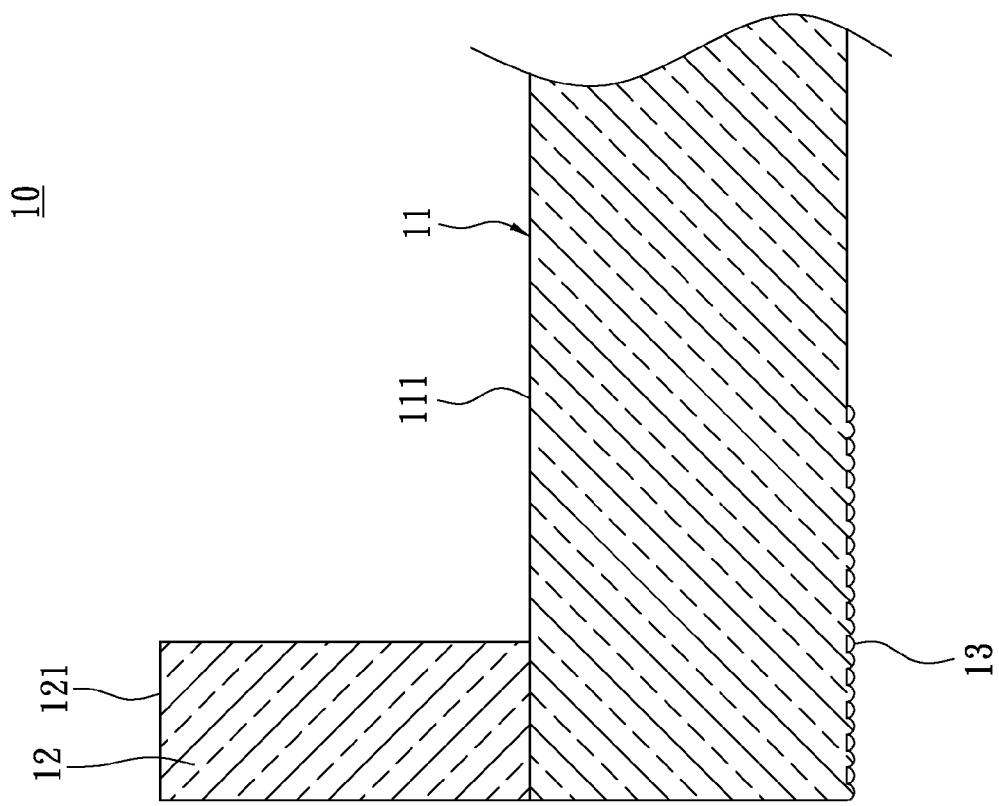
FIG. 4 is a sectional view of FIG. 3 along a section line 4-4.

A light-guiding member 12 is formed on a surface (ex.: upper surface) of the main body 11 around the edge of the thru-opening 113. Please refer to FIG. 4, the light-guiding member 12 is a rim-like protruding structure protruded from the upper surface of the main body 11 around the thru-opening 113. In this embodiment, the light-guiding member 12 and the main body 11 are usually made of the same material and integrally formed with an L-shaped cross-section.

A plurality of micro structures 13 are formed around the thru-opening 113 on an opposite surface (ex.: lower surface) of the main body 11. The micro structures 13 can be arranged within an area of the main body 11 that corresponds to the light-guiding member 12, i.e., an area on the lower surface of the main body 11 where light-guiding member 12 is formed thereon. However, the micro structures 13 can also be arranged going beyond the corresponding area of the light-guiding member 12 (please see FIGS. 2 and 4). The shape of the micro structures 13 can be convex structures or dots that bulge outward from the lower surface of the main body 11. Alternative designs may be concave structures that concave inward from the lower surface of the main body 11. The shape of the micro structures 13 is not restricted, as long as uniform illumination can be achieved. The aforementioned convex or concave micro structures 13 can be formed through an etching process or a texture treatment, while the dots can be formed by a printing process. In addition, the micro structures 13 can be gradually or uniformly arranged, or using any other arrangement in providing uniform illumination.

The light-emitting units 20 are arranged around the outside of the light-guiding member 12 and emit light toward the first edge portions 111 and the second edge portions 112. The light-emitting units 20 can be light emitting diodes (LEDs). A plurality of grooves 14 are formed on the main body 11 for receiving the light-emitting units 20. Based on the above descriptions, the light-guiding structure 1 is formed accordingly.

Light emitted form the light-emitting units 20 propagates within the first and second edge portions 111, 112 and exits upward. Accordingly, an upper surface 121 of the light-guiding member 12 is illuminated. In addition, the light-guiding member 12 can illuminate more uniformly through the micro structures 13.

In FIG. 3, four grooves 14 are formed on the main body 11. Two grooves 14 are formed on one of the first edge portion 111, and two other grooves 14 are formed symmetrically on the opposing first edge portion 111. Each groove 14 is near a corner of the thru-opening 113 and accommodates one light-emitting unit 20. In other words, each first edge portion 111 would have two light-emitting units 20. One of the two light-emitting units 20 arranged on the same first edge portion 111 can emit light toward the corresponding first edge portion 111, while the other light-emitting unit 20 arranged on the same first edge portion 111 would emit light toward the adjacent second edge portion 112. The other pair of light-emitting units 20 arranged on the opposing first edge portion 111 operates in a similar manner. In particular, one of the two light-emitting units 20 arranged on the opposite first edge portion 111 can emit light toward the corresponding first edge portion 111, while the other light-emitting unit 20 arranged on the opposing first edge portion 111 would emit light toward the other second edge portion 112 arranged adjacently thereto. In other words, the four light-emitting units 20 can emit light toward four directions and the light-guiding member 12 around the thru-opening 113 thus illuminate uniformly.

Figure 6:
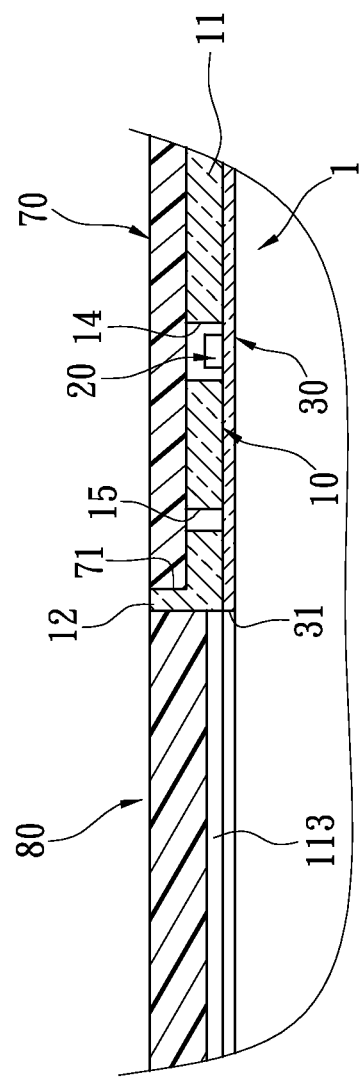
FIG. 6 is a sectional view of FIG. 5 along a section line 6-6.

Please refer to FIGS. 5 and 6. Besides the light-guiding structure 1, the aforementioned electronic device 7 also comprises a housing 70 and a touch pad structure 80. The housing 70 is provided with a slot 71 passing through the housing 70. Generally, the touch pad structure 80 includes an operating interface on its upper surface. In this embodiment, the electronic device 7 is a laptop computer. In alternative embodiment, the electronic device 7 can be other types of electronic device having different types of touch structure.

When assembling, the thru-opening 113 of the light-guiding plate 10 can receive the touch pad structure 80, thus the overall thickness of the light-guiding structure 1 and the touch pad structure 80 would be reduced. The light-guiding plate 10 has the light-guiding member 12 formed around the thru-opening 113, and the light-guiding member 12 protrudes outward from the main body 11. Most of the light-guiding plate 10 is covered over the housing 70. The light-guiding member 12 and the touch pad structure 80 are both exposed through the slot 71 of the housing 70. According to the above description, light emitted by the light-emitting units 20 is transmitted within the light-guiding plate 10 and is emitted out the upper surface 121 of the light-guiding member 12. Since the light-guiding member 12 surrounds the touch pad structure 80, the periphery of the touch pad structure 80 can be illuminated. The thickness of the touch pad structure 80 can be the same or less than that of the light-guiding member 12. The upper surface 121 of the light-guiding member 12 can be leveled with the upper surface of the touch pad structure 80. Therefore, no gap or step would exist between the light-guiding structure 1 and the touch pad structure 80.

Preferably, the upper surface 121 of the light-guiding member 12, the upper surface of the touch pad structure 80, and an upper surface of the housing 70 should be leveled. Thereby, the outer structure of the electronic device 7 would not have any step section.

Notably, bright spots are often generated by the light emitted from the light-emitting units 20 on the light-guiding plate 10 (e.g. the corner area of the thru-opening 113). Please refer back to FIGS. 1 and 3. A plurality of slits 15 can further be formed on the main body 11 of the light-guiding plate 10 between the light-guiding member 12 and the light-emitting units 20. Each slit 15 is disposed on the light path of the respective light-emitting unit 20 to the thru-opening 113. In this embodiment, the slits 15 are located near the corners of the thru-opening 113 respectively and facing the light emitting side of the respective light-emitting units 20. Because the slits 15 can block the light emitted from the light-emitting units 20, the shapes and positions of the slits 15 can be varied to control the amount of emitting light toward the thru-opening 113. In other words, the luminous flux in the corners of the thru-opening 113 would be decreased. Thereby, the brightness of the bright spots caused by the light-emitting units 20 can be weakened. Thus, the light-guiding member 12 would emit light uniformly and no bright spot is formed near the corners of the thru-opening 113. The slits 15 can be penetrated through the main body 11 or not penetrated through the main body 11. The shape of the slits 15 is also not restricted, which can be substantially rectangular as shown in the figures or any other geometric shape.

Please refer back to FIG. 1. The light-guiding structure 1 further includes an opaque dividing member 30. The dividing member 30 is disposed under the lower surface of the main body 11. A through hole 31, which is corresponding to the thru-opening 113, is formed on the dividing member 30. In this embodiment, the dividing member 30 is a colored Mylar or adhesive sheet, with a similar shape as the main body 11. The dividing member 30 is pasted onto the entire lower surface of the main body 11, which includes the area that corresponds to the light-guiding member 12. In alternative embodiments, the dividing member 30 can be restricted to a rim-like structure having a rectangular area that corresponds to the light-guiding member 12 only. Therefore, when light is not emitted by the light-guiding plate 10, the light-guiding member 12 would show the color of the dividing member 30 instead, such as black or white. Thus, under the ambient condition, the visual representation of the light-guiding plate 10 can be assigned.

Figure 7:
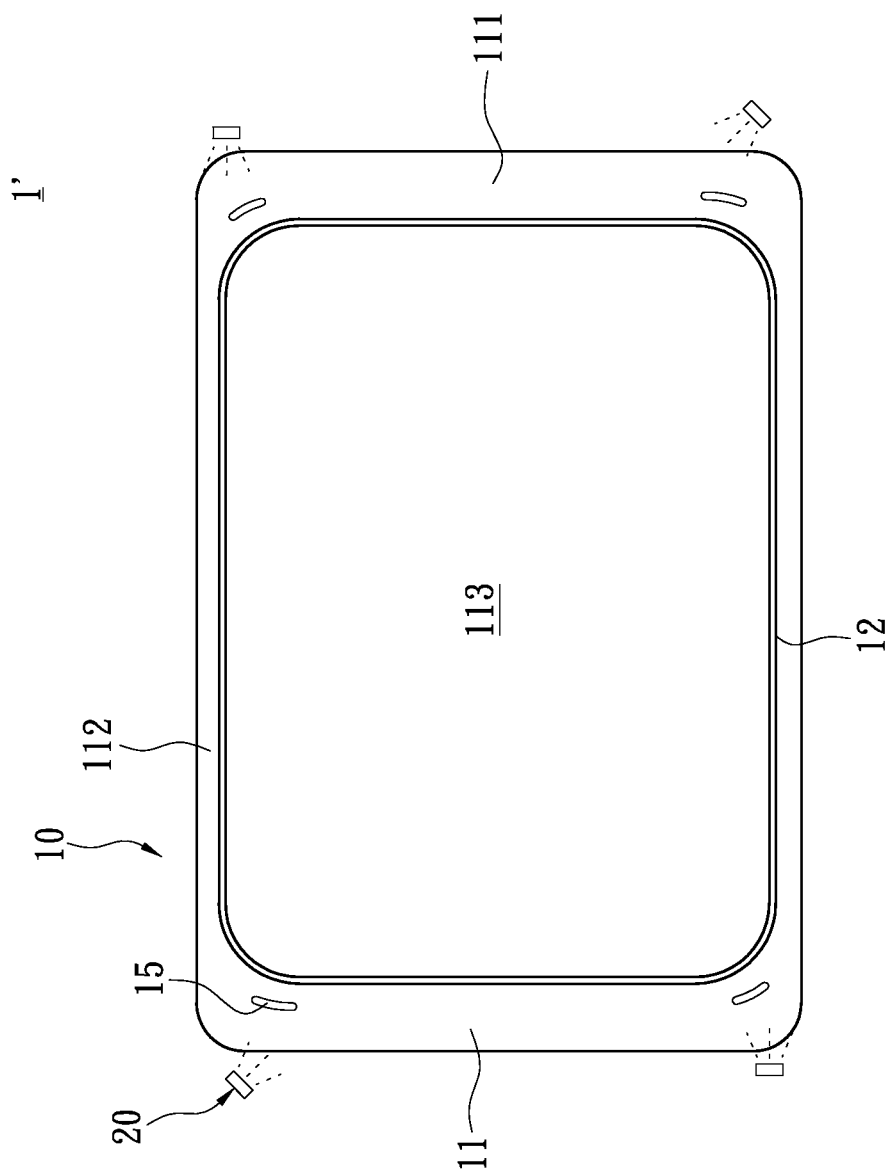
FIG. 7 is a top view of a light-guiding structure according to the second preferred embodiment of the present invention.

Please refer to FIG. 7, which shows the second preferred embodiment of a light-guiding structure 1' according to this invention. The differences between the second and first preferred embodiments are as follows. The main body 11 of the light-guiding plate 10 of the second preferred embodiment is still rectangular shaped but smaller in size. The light-emitting units 20 are disposed beyond the main body 11 but still are disposed around the light-guiding member 12. Like the previous embodiment, the slits 15 are formed on the main body 11 and corresponding to the light-emitting units 20 respectively. The slits 15 are near the corners of the thru-opening 113 and face the light emitting sides of the light-emitting units 20, respectively. Light emitted from the light-emitting units 20 can be propagated to the main body 11 in the same way as the preferred first embodiment, and the slits 15 would reduce the bright spot issue.

Figure 8:
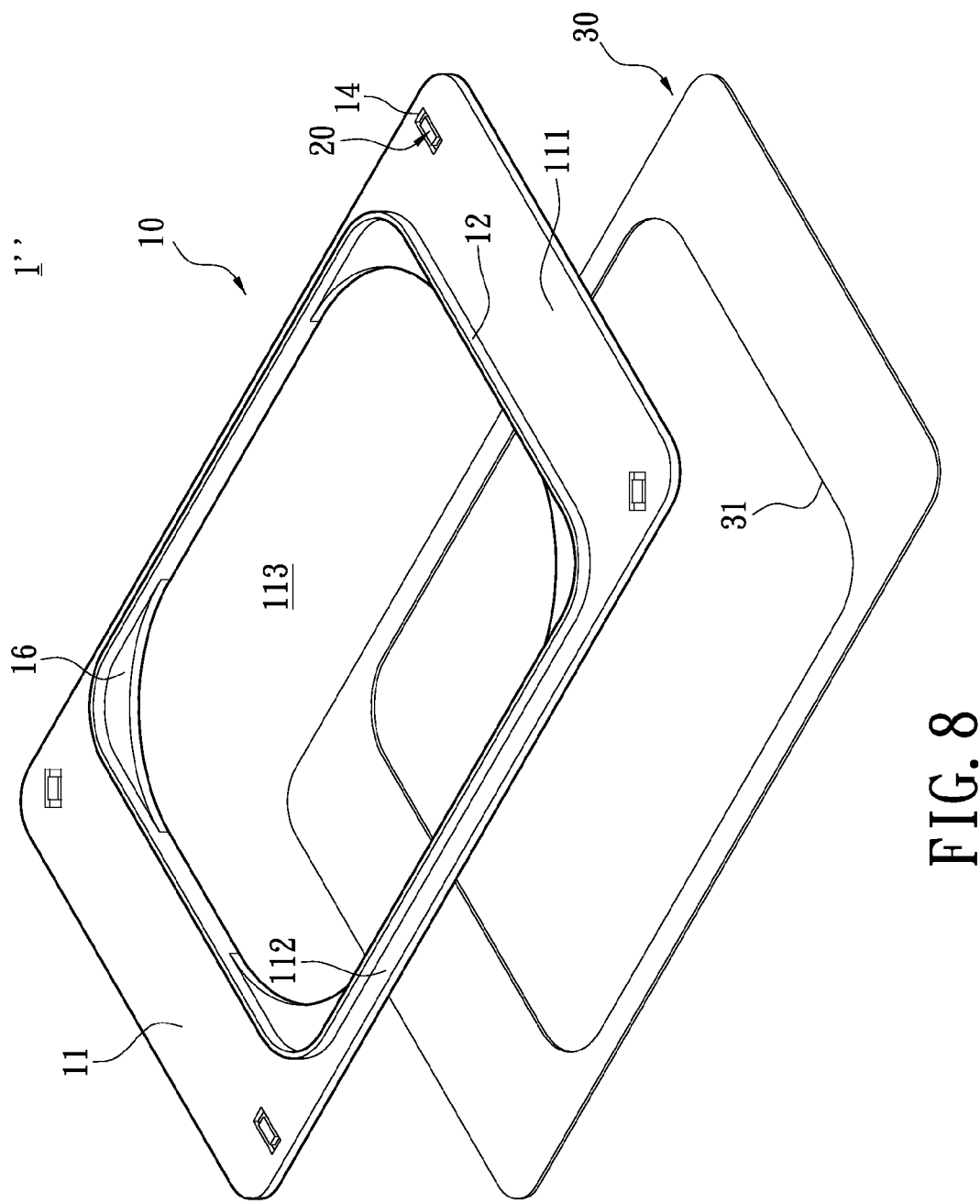
FIG. 8 is an exploded view of a light-guiding structure according to the third preferred embodiment of the present invention.

Please refer to FIG. 8, which shows the third preferred embodiment of a light-guiding structure 1" according to this invention. The differences between the third and first preferred embodiments are as follows. Namely, the main body 11 of the light-guiding plate 10 has no slits 15 of the first preferred embodiment formed thereon. Instead, a plurality of extensions 16 is formed on the main body 11. Each extension 16 is positioned in the light path between the respective light-emitting unit 20 and the thru-opening 113. The extensions 16 protrude horizontally from the inner edge of the thru-opening 113 (e.g. at the corner of the thru-opening 113). The extensions 16 are made of light-transmissive material, with thicknesses less than the total thickness of the light-guiding member 12 and the light-guiding plate 11. Preferably, the thickness of the extension 16 is equal or less than the thickness of the main body 11 to accommodate the touch pad structure 80. In addition, the extensions 16 in this embodiment are circular triangles, but the shape of the extensions 16 is not limited thereto. The touch pad structure 80 is received by the thru-opening 113 and disposed on the extensions 16. Preferably, the upper surface of touch pad structure 80 disposed on the extensions 16 can be leveled with those of the light-guiding member 12 and the housing 7.

When the light-emitting units 20 emit light toward the corners of the thru-opening 113, a part of light is transmitted toward the light-guiding member 12, while another part of light is transmitted to the extensions 16. Hence, the luminous flux in the corners of the thru-opening 113 is reduced. Therefore, the light-guiding plate 10 is less likely to have bright spots and can enable the light-guiding member 12 to illuminate uniformly. In other words, the bright spots issue in the light-guiding structure 1" can also be eliminated.

Based on the above, the present electronic device comprises the touch pad structure and the light-guiding structure. The thru-opening is formed on the light-guiding plate of the light-guiding structure for receiving the touch pad structure. Thereby, the overall thickness of the light-guiding structure plus the touch pad structure can be reduced. In addition, the light-guiding plate has the light-guiding member formed around the thru-opening for illumination.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An electronic device, comprising:
   a housing having a slot;
   a touch pad structure; and
   a light-guiding structure, comprising:
      a light-guiding plate including a main body, the main body having a thru-opening formed thereon, wherein the main body has a pair of opposing first edge portions and a pair of opposing second edge portions, wherein the thru-opening is defined by the pair of first edge portions and the pair of second edge portion;
      a light-guiding member disposed on a surface of the main body around the thru-opening; and
      a plurality of light-emitting units disposed around the light-guiding member and corresponding to the first and the second edge portions for emitting light toward the first and the second edge portions respectively;
   wherein at least a portion of the touch pad structure is received in the thru-opening and surrounded by the light-guiding member, and at least a portion of the touch pad structure and the light-guiding member are exposed through the slot of the housing.

2. The electronic device of claim 1, wherein a plurality of slits are formed on the main body and between the light-guiding member and the light-emitting units, the slits being in a light path of respective light-emitting units emitting light to the thru-opening.

3. The electronic device of claim 1, wherein the main body has a plurality of extensions protruding horizontally from the corresponding corners between the first edge portions and the second edge portions, and the extensions are in a light path of the respective light-emitting units emitting light to the thru-opening.

4. The electronic device of claim 3, wherein the thickness of the extension is less than the thickness of the light-guiding member and the light-guiding plate.

5. The electronic device of claim 3, wherein the thickness of the extension is equal to or less than the thickness of the main body.

6. The electronic device of claim 1, wherein a plurality of micro structures are formed around the thru-opening on an opposite surface of the main body relative to the surface where the light-guiding member is disposed thereon.

7. The electronic device of claim 6, wherein the first edge portion has a greater width than the second edge portion, and the thru-opening is rectangular-shaped.

8. The electronic device of claim 6, wherein the light-guiding structure further comprises an opaque dividing member, the dividing member being disposed on the opposite surface of the main body, and wherein a through hole is formed on the dividing member aligning to the thru-opening.

9. The electronic device of claim 8, wherein the dividing member is a Mylar sheet.

10. The electronic device of claim 1, wherein the light-emitting units are disposed beyond the main body.

11. The electronic device of claim 1, wherein a plurality of grooves are formed on the main body for receiving the light-emitting units.

12. The electronic device of claim 1, wherein upper surfaces of the light-guiding member, the touch pad structure, and the housing are leveled.

13. A light-guiding structure of the electronic device, comprising:
   a light-guiding plate including a main body, the main body having a thru-opening formed thereon, wherein the main body has a pair of opposing first edge portions and a pair of opposing second edge portions, wherein the thru-opening is defined by the pair of first edge portions and the pair of second edge portions, a light-guiding member formed on a surface of the main body around the thru-opening, a plurality of micro structures formed around the thru-opening on an opposite surface of the main body relative to the surface where the light-guiding member is formed thereon; and
   a plurality of light-emitting units disposed on the main body and away from the light-guiding member for illuminating toward the first and second edge portions respectively.

14. The light-guiding structure of the electronic device of claim 13, wherein a plurality of slits are formed on the main body and between the light-guiding member and the light-emitting units, the slits being in the light path of respective light-emitting units emitting light to the thru-opening.

15. The light-guiding structure of the electronic device of claim 13, wherein the main body has a plurality of extensions, the extensions being protruded horizontally from the corresponding corners between the first edge portions and the second edge portions, and wherein the extensions are in the light path of respective light-emitting units emitting light to the thru-opening.

16. The light-guiding structure of the electronic device of claim 15, wherein the thickness of the extension is less than the thickness of the light-guiding member and the light-guiding plate.

17. The light-guiding structure of the electronic device of claim 15, wherein the thickness of the extension is equal to or less than the thickness of the main body.

18. The light-guiding structure of the electronic device of claim 13, wherein the first edge portion has a greater width than the second edge portion, and wherein the thru-opening is rectangular-shaped.

19. The light-guiding structure of the electronic device of claim 13, wherein the micro structures have convex surfaces bulging from the main body or concaved surfaces curving inwardly of the main body.

20. The light-guiding structure of the electronic device of claim 13, wherein the micro structures form a mesh.

\* \* \* \* \*